United States Patent [19]
Di Amico

[11] Patent Number: 5,244,569
[45] Date of Patent: Sep. 14, 1993

[54] TOXIC LIQUID COLLECTOR

[76] Inventor: Paul Di Amico, 500 E. Palm Canyon, Palm Springs, Calif. 92264

[21] Appl. No.: 835,419

[22] Filed: Feb. 14, 1992

[51] Int. Cl.$^5$ .............................................. C02F 1/40
[52] U.S. Cl. ................... 210/163; 210/170; 210/171; 210/536; 210/538
[58] Field of Search .............. 210/170, 171, 172, 163, 210/164, 165, 254, 261, 307, 312, 313, 532.1, 536, 538, 540, 187; 220/571, 572, 573

[56] References Cited

U.S. PATENT DOCUMENTS

| | | | |
|---|---|---|---|
| 620,316 | 2/1899 | Haselden | 210/312 |
| 671,098 | 4/1901 | Warden | 210/307 |
| 1,490,576 | 4/1924 | Allen | 210/187 |
| 1,582,914 | 5/1926 | Farley | 210/532.2 |
| 1,716,934 | 6/1929 | Smith | 210/187 |
| 2,550,402 | 4/1951 | Boosey | 210/165 |
| 3,878,101 | 4/1975 | Kennedy | 210/536 |
| 4,299,697 | 11/1981 | Curati, Jr. | 210/532.1 |

FOREIGN PATENT DOCUMENTS 603146 8/1960 Canada.
628250 10/1978 U.S.S.R..

Primary Examiner—Christopher Upton
Attorney, Agent, or Firm—Roger A. Marrs

[57] ABSTRACT

A collector is disclosed herein for use in combination with equipment holding petroleum products, such as oil, grease or the like, and more particularly, to a novel collector suitable for attachment to such equipment for collecting oil seepage and lubricant excess which may fall or drip into the collector. In one form of the invention, the collector includes a box-like container having reinforcement sections disposed beneath an open grill through which the petroleum seepage may pass for collection within the container. A plurality of conduits is carried within the collector for conducting electrical cabling therethrough. Drainage spouts are employed for conducting separated water from the petroleum product into a drainage basin.

5 Claims, 1 Drawing Sheet

TOXIC LIQUID COLLECTOR

BACKGROUND OF THE INVENTION

1. Field of the Invention

The present invention relates to the field of petroleum waste and seepage collectors, and more particularly to a novel collector which may be placed on the ground or above the ground and which includes an open grill supported by reinforcement as well as means for draining separated water from the collected petroleum product.

2. Brief Description of the Prior Art

It is the conventional practice to employ large windmill devices for operating electro-generating equipment and in this connection, transformers are usually placed in close proximity to the fan either above or below ground. In either event, petroleum products, such as oil, grease or the like have a tendency to seep from the transformer or drip from the transformer into the surrounding ground which toxifies the surrounding environment. In order to detoxify or clean up the surrounding area, an extensive and costly procedure is necessary so that the earth and ground in the vicinity of the transformer can be used again.

Therefore, a long-standing need has existed to provide a means for collecting and holding in temporary storage, quantities of petroleum product which may leak from the transformer. Also, means must be provided for conducting electrical cabling through the collector in such a way as not to be contaminated by the petroleum product.

SUMMARY OF THE INVENTION

Accordingly, the above problems and difficulties are obviated by the present invention which provides a novel means for collecting petroleum leakage from transformers or the like and which include an enclosed container having an open top across which a grid is carried. The grid comprises a plurality of cross pieces and members which crisscross over the opening leading into the container so as to leave large openings through which the leakage may pass. The grid is reinforced and rests upon I-beam supports and braces which in turn are carried on channel sections so that a rugged and rigidized container is provided. A plurality of tubing extends from the bottom of the container and through the grid at the top so that electrical cabling may be passed through the container without coming into contact with the petroleum product collected.

Therefore, it is among the primary objects of the present invention to provide a novel collector for petroleum products that may leak of seep from such equipment as transformers, transmissions or the like.

Another object of the present invention is to provide a novel container that may be readily placed in juxtaposition to a transformer either above or on level ground.

Still a further object of the present invention is to provide a novel container which includes means for conducting electrical conduits therethrough so that it will not be contaminated by collected seepage from transformers or the like.

Another object of the present invention resides in a novel container suitable to be installed above or at ground level which gathers oil seepage and residue from elevated equipment and that includes a gravity water separator so that collected oil waste may be recycled.

A further object resides in an enlarged container having a grid top with sufficient openings to pass oil and grease seepage to the container for subsequent recycling.

Another object resides in the provision of an environmental protection device for collecting and storing oil residue in a manner protecting the surrounding area from petroleum product contamination.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
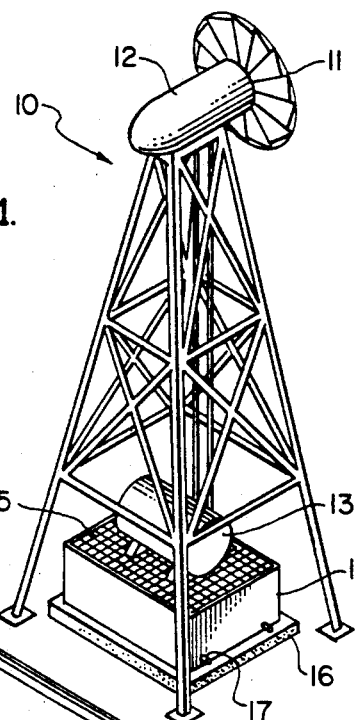
FIG. 1 is an illustration of a typical agricultural fan and illustrating a transformer immediately above the inventive collector of the present invention.

Referring to FIG. 1, a windmill apparatus is indicated in the general direction of arrow 10 which includes a giant fan 11 that is powered by a motor or power means 12. The motor is operably connected to a transformer, indicated by numeral 13, which may be located above ground or at ground level. During the operation of the windmill, the transformer has a tendency to leak oil and other petroleum products which if not for the present invention, would reach the ground supporting the windmill and contaminate the earth and environment.

In order to avoid such contamination, the inventive concept includes a box-like collector or receptacle broadly indicated by numeral 14, which includes a continuous sidewall which defines an open interior or cavity into which dripping oil can be collected. It is important to note that the receptacle or container 14 is directly beneath the transformer 13 and that a grid 15 is supported on the top edge of the sidewall for the container. Preferably, when the container is mounted above ground, a support slab 16 is employed to carry the weight of the container. Water may be separated from the oil content in the container by means of conduits, such as conduit 17, which carry the water exteriorly of the container. The oil content remaining can then be recycled for other purposes.

Figure 2:
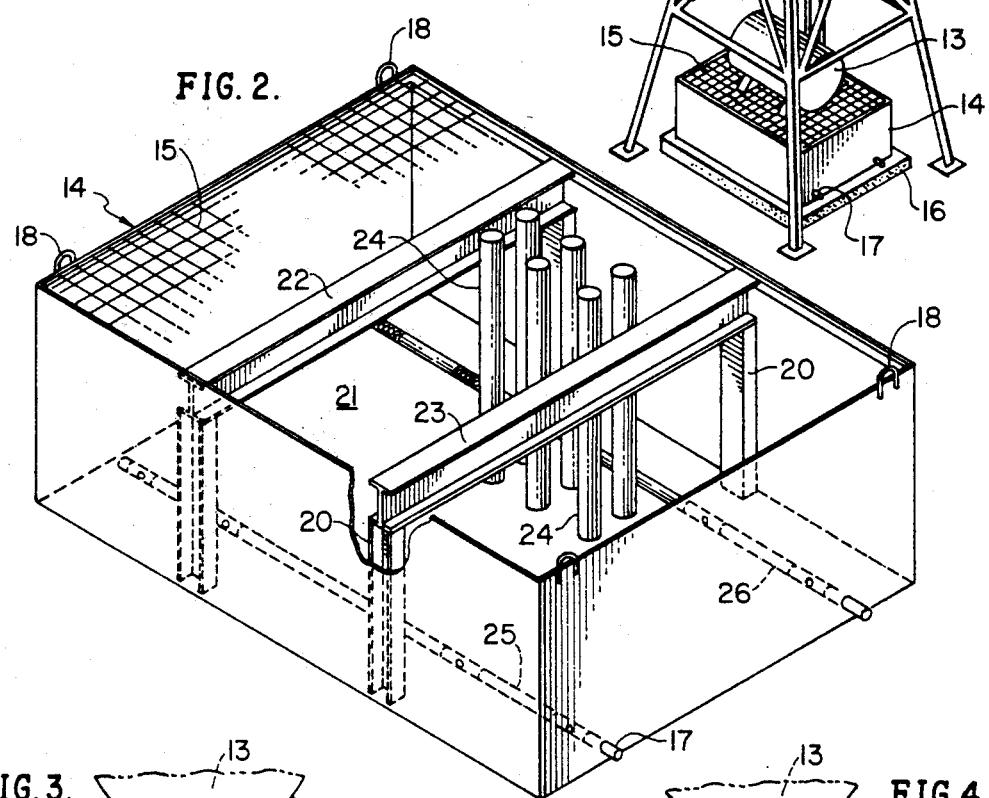
FIG. 2 is an enlarged perspective view of the novel collector shown in FIG. 1.

Referring now in detail to FIG. 2, it can be seen that the grid 15 is of wide mesh and that it is supported on the top of the sidewall defining the storage cavity of container 14. Handling loops or eyelets, such as identified by numeral 18, are used for attaching cables so that loaded or full containers can be moved by lifting equipment onto trucks or the like. In this manner, the oil content can be transported in the container for recycling.

The container 14 further includes side channels 20 which have opposite ends bearing against a bottom of the container 21 and at their other ends support I-beams 22 and 23. The I-beams extend laterally across the top of the container immediately under the grid 15 so that the respective ends of the I-beams can be welded or otherwise secured to the channels 20. The I-beams 22 cooperate with the channels 20 in order to support the load of the transformer 13. A plurality of tubes, such as tube 24, are open-ended through the bottom 21 and the grid 15. The tubes are available for passage of electrical cabling or conduits leading to the transformer 13 from underground installations. The bottom 21 is provided with elongated recesses 25 and 26 which terminate exteriorly through the drains 17 for conducting water which percolates downwardly through the oil for exterior disposition. Such a drainage of water conditions the stored oil for recycling purposes.

Figures 3, 4:
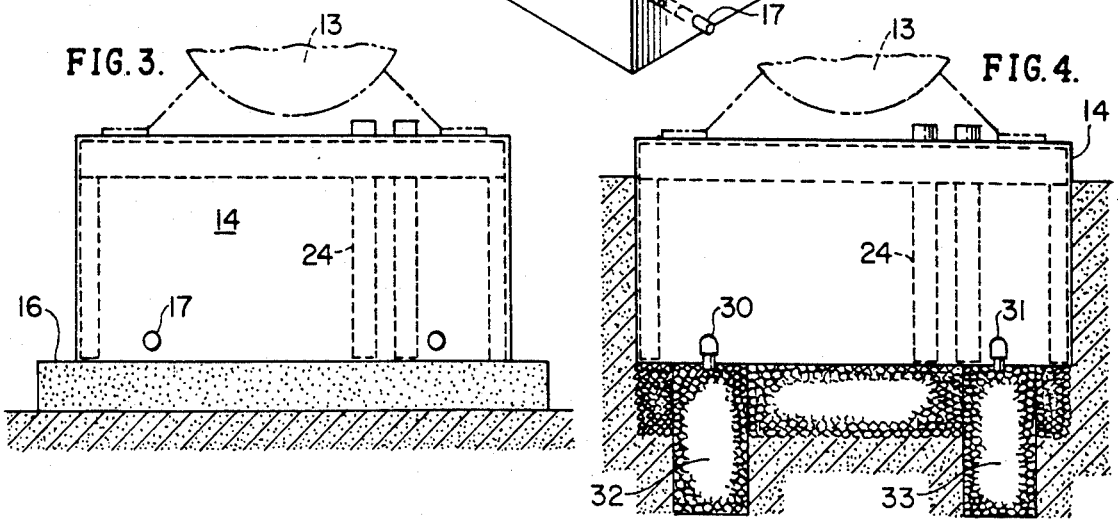
FIG. 3 is a side elevational view of the collector illustrated in an above ground application.
FIG. 4 is a view similar to the view of FIG. 3 illustrating the collector at ground level.

Referring now in detail to FIG. 3, it can be seen that the container 14 is carried above ground and is on the slab 16 as shown in FIG. 1. However, in FIG. 4, the container is at level or below ground and the drainage taps are indicated by numerals 30 and 31 which deposit collected water into sumps 32 and 33 respectively.

In view of the foregoing, it can be seen that the novel petroleum product collector of the present invention includes a container which not only supports the transformer or other apparatus using petroleum products but directly receives any leakage or seepage of petroleum products from the apparatus. The product may drip or flow through the openings in the grill 15 for storage initially along the bottom 21 of the container and then fills upwardly along the continuous sidewall. The container becomes a barrier between the leaking apparatus and the underlying ground so that the petroleum product is separated from the ground at all times and does not enter the ground, which the oil product would normally contaminate. If desired, the oil may be reclaimed from storage so that the container need not be removed from its installation or, the container can be removed including the oil for service and maintenance purposes. Water is drained from the petroleum product via spigots or drain fixtures and electrical cabling or conduits may be accommodated through the tubes. The container is reinforced by the channels and the I-beams so that loads from the electrical apparatus will be passed through the beams and channels directly to the supporting slab or to the ground.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A toxic liquid collector comprising:
   a container having an open top defined by an edge of a continuous sidewall and having a bottom;
   a grid disposed on said sidewall edge having a plurality of openings communicating with the interior of said container;
   drainage means having a spigot carried on said container for conducting water separated from collected oil exteriorly of said container;
   a plurality of open-ended tubes extending through said container bottom and said container terminating at one end through said grid;
   oil lubricated apparatus mounted on said grid; and
   said container being located directly beneath said apparatus to provide means to receive oil seepage and leakage from said apparatus.

2. The invention as defined in claim 1 including:
   support reinforcement means disposed in said container against said continuous sidewall and against said grid for distribution of applied loads from said apparatus.

3. The invention as defined in claim 2 wherein:
   said container rests on a slab above ground.

4. The invention as defined in claim 2 wherein:
   said container is at ground level.

5. The invention as defined in claim 2 wherein:
   said drainage means includes an oil and water separator comprising grooves in said container conducting water gravitationally removed from said oil; and
   said spigot comprises nozzles carried on said sidewall in alignment with said grooves for carrying separated water externally of said container.

* * * * *